(12) United States Patent
Zhu et al.

(10) Patent No.: US 11,320,717 B2
(45) Date of Patent: May 3, 2022

(54) OPTICAL PHASE ARRAY, METHODS OF FORMING AND OPERATING THE SAME

(71) Applicant: ADVANCED MICRO FOUNDRY PTE. LTD., Singapore (SG)

(72) Inventors: Shiyang Zhu, Singapore (SG); Edward Sing Chee Koh, Singapore (SG); Patrick Guo-Qiang Lo, Singapore (SG)

(73) Assignee: ADVANCED MICRO FOUNDRY PTE. LTD., Singapore (SG)

( * ) Notice: Subject to any disclaimer, the term of this patent is extended or adjusted under 35 U.S.C. 154(b) by 71 days.

(21) Appl. No.: 16/647,982

(22) PCT Filed: Sep. 18, 2017

(86) PCT No.: PCT/SG2017/050469
§ 371 (c)(1),
(2) Date: Mar. 17, 2020

(87) PCT Pub. No.: WO2019/054939
PCT Pub. Date: Mar. 21, 2019

(65) Prior Publication Data
US 2020/0264490 A1 Aug. 20, 2020

(51) Int. Cl.
| G02F 1/295 | (2006.01) |
| G01S 17/89 | (2020.01) |
| G02F 1/29 | (2006.01) |
| G01S 7/481 | (2006.01) |

(52) U.S. Cl.
CPC ............ *G02F 1/2955* (2013.01); *G01S 17/89* (2013.01); *G02F 1/292* (2013.01); *G01S 7/4817* (2013.01)

(58) Field of Classification Search
CPC .................................................... G02F 1/2955
See application file for complete search history.

(56) References Cited

U.S. PATENT DOCUMENTS

| 9,740,079 B1 | 8/2017 | Davids |
| 2009/0167605 A1 | 7/2009 | Haskell |
| 2017/0131615 A1 | 5/2017 | Park |
| (Continued) | | |

FOREIGN PATENT DOCUMENTS

| CN | 106597413 A | 4/2017 |

OTHER PUBLICATIONS

International Search Report for corresponding application PCT/SG2017/050469 filed Sep. 18, 2017; dated Dec. 13, 2017.

(Continued)

*Primary Examiner* — John Bedtelyon
(74) *Attorney, Agent, or Firm* — Cantor Colburn LLP

(57) ABSTRACT

Various embodiments may provide an optical phase array. The optical phase array may include a laser source configured to emit a laser. The optical phase array may further include an integrated photonic network with n stages of optical splitters, the optical splitters being 1 χ 2 optical splitters, each optical splitter of the integrated photonic network having an input, a first output, and a second output. The integrated photonic network may be configured to separate the laser into N outputs. Each output of the N outputs may differ from a neighbouring output of the N outputs by a constant phase difference ($\Delta\varphi$). N may be equal to 2 to the power of n.

20 Claims, 11 Drawing Sheets

(56) References Cited

U.S. PATENT DOCUMENTS

2018/0052378 A1* 2/2018 Shin ..................... G01S 7/4813
2018/0321569 A1* 11/2018 Spector ............. G02B 21/0032

OTHER PUBLICATIONS

Written Opinion for corresponding application PCT/SG2017/050469 filed Sep. 18, 2017; dated Dec. 13, 2017.
Martijn J.R. Heck, "Highly integrated optical phased arrays: photonic integrated circuits for optical beam shaping and beam steering", Nanophotonics 2017; 6(1): 93-107.
Karel Van Acoleyen, "Off-chip beam steering with a one-dimensional optical phased array on silicon-on-insulator", May 1, 2009 / vol. 34, No. 9 / Optics Letters.

* cited by examiner

FIG. 4B $$V_1 = V \qquad 0 < V < V_{2\pi}$$

$$V_2 = \begin{cases} \sqrt{2}V & 0 < V < V_{2\pi}/\sqrt{2} \\ \sqrt{2}(V-V_{2\pi}/\sqrt{2}) & V_{2\pi}/\sqrt{2} < V < V_{2\pi} \end{cases}$$

$$V_3 = \begin{cases} \sqrt{4}V & 0 < V < V_{2\pi}/\sqrt{4} \\ \sqrt{4}(V-V_{2\pi}/\sqrt{4}) & V_{2\pi}/\sqrt{4} < V < V_{2\pi}\sqrt{2}/\sqrt{4} \\ \sqrt{4}(V-V_{2\pi}\sqrt{2}/\sqrt{4}) & V_{2\pi}\sqrt{2}/\sqrt{4} < V < V_{2\pi}\sqrt{3}/\sqrt{4} \\ \sqrt{4}(V-V_{2\pi}\sqrt{3}/\sqrt{4}) & V_{2\pi}\sqrt{3}/\sqrt{4} < V < V_{2\pi}/\sqrt{4} \end{cases}$$

$$\bullet \bullet \bullet$$

$$V_{\log_2 N} = \begin{cases} \sqrt{N/2}\,V & 0 < V < V_{2\pi}/\sqrt{N/2} \\ \sqrt{N/2}\,(V-V_{2\pi}/\sqrt{N/2}) & V_{2\pi}/\sqrt{N/2} < V < V_{2\pi}\sqrt{2}/\sqrt{N/2} \\ \bullet \bullet \bullet \\ \sqrt{N/2}(V-V_{2\pi}\sqrt{i}/\sqrt{N/2}) & V_{2\pi}\sqrt{i}/\sqrt{N/2} < V < V_{2\pi}\sqrt{i+1}/\sqrt{N/2} \\ \bullet \bullet \bullet \\ \sqrt{N/2}(V-V_{2\pi}\sqrt{\frac{N}{2}-1}/\sqrt{N/2}) & V_{2\pi}\sqrt{\frac{N}{2}-1}/\sqrt{N/2} < V < V_{2\pi} \end{cases}$$

OPTICAL PHASE ARRAY, METHODS OF FORMING AND OPERATING THE SAME

TECHNICAL FIELD

Various aspects of this disclosure relate to optical phase arrays. Various aspects of this disclosure relate to methods of forming optical phase arrays. Various aspects of this disclosure relate to methods of operating optical phase arrays.

BACKGROUND

Devices for fast scanning based on narrow free-space laser beams have found major applications in three-dimensional imaging and mapping, such as Light Detection And Ranging (LiDAR) for remote sensing and navigation, as well as secure free-space optical communications. Optical phased arrays (OPAs) can realize such non-mechanical beam steering and can be fabricated on silicon platforms using the standard silicon photonics technology.

An OPA may include a series of emitters (antennas) fed from a common coherent source, where the optical phase from each emitter may be controlled to form a desired wave front at the near field. Thus, an OPA contains three main components: couplers or splitters to divide the input light to the set of emitters, phase shifters to control the relative phase of each antenna, and optical antennas to emit (or couple) light to (or from) free space.

FIG. 1A shows the operation principle of an optical phased array (OPA) which has N number of channels. The phase difference between optical light along neighboring channels is $\Delta\phi$. The steering angle $\theta$ may be provided by:

$$\sin\theta = \frac{\lambda \cdot \Delta\phi}{2\pi \cdot d}, \quad (1)$$

whereas the beam width may approximately be given by:

$$\Delta\theta = \frac{0.866\lambda}{Nd\cos\theta}, \quad (2)$$

where d is the distance between the emitters and $\lambda$ is the wavelength of the optical light. N should be sufficiently large in order to obtain beams with sufficiently narrow widths.

FIG. 1B is a schematic showing a phase shifting architecture with separate phase shifters in different channels to control the phase of optical light traveling along the channels independently. As seen from FIG. 1B, the phase difference between optical light along neighboring channels and emitted by the emitters is $\Delta\phi$. There are N number of channels and N−1 phase shifters.

For each channel, the voltage (power) applied to the phase shifter can be reset once the phase shift reaches $2\pi$. The maximum required total phase shift is approximately $\pi \times (N-1)$. However, the array shown in FIG. 1B would require (N−1) voltages (or voltage signals) to steer the beam in each direction. As such, a Look-Up Table (LUT) may be required. The electric control would be quite complex and the steering speed would be slow because the (N−1) voltages need to be arranged and stabilized for each direction.

FIG. 1C is a schematic showing another phase shifting architecture in which one voltage (or voltage signal) is applied to identical phase shifters. The phase shifters are arranged in a triangular arrangement with increasing number of phase shifters along respective subsequent channels as shown in FIG. 1C, and a voltage (or voltage signal) is applied on each of the identical phase shifters so that a constant phase difference between neighbouring antennas is obtained. The total required phase shift is $[N \times (N-1)/2] \times \Delta\phi$. The power consumption of this architecture may be very large when N becomes large.

FIG. 1D is a schematic showing yet another phase shifting architecture in which one voltage (or voltage signal) is applied to identical phase shifters. This architecture may address some of the shortcomings of the architectures shown in FIG. 1B and FIG. 1C. The phase shifting architecture is a cascaded phase shifting architecture which may enable continuous steering using one input signal, i.e. similar to that of the architecture shown in FIG. 1C. The total phase shift is $(N-1) \times \Delta\phi$. However, only evanescent splitters may be used.

The design of such splitters becomes more challenging and sensitive to fabrication errors as the number of channels increases.

SUMMARY

Various embodiments may provide an optical phase array. The optical phase array may include a laser source configured to emit a laser. The optical phase array may further include an integrated photonic network with n stages of optical splitters, the optical splitters being 1×2 optical splitters, each optical splitter of the integrated photonic network having an input, a first output, and a second output. The integrated photonic network may be configured to separate the laser into N outputs. Each output of the N outputs may differ from a neighbouring output of the N outputs by a constant phase difference ($\Delta\phi$). N may be equal to 2 to the power of n. An $i^{th}$ stage of the n stages may have $2^{i-1}$ of the optical splitters, the first output of each optical splitter of the $2^{i-1}$ optical splitters being optically coupled to a first waveguide, and the second output of each optical splitter of the $2^{i-1}$ optical splitters being optically coupled to a second waveguide. The first waveguide of the $i^{th}$ stage may be configured so that a first beam travelling though the first waveguide undergoes no phase shift. The second waveguide of the $i^{th}$ stage may be configured so that a second beam travelling through the waveguide undergoes a phase shift equal to N divided by $2^i$ and further multiplied by the constant phase difference. n may be any integer greater than 1.

Various embodiments may provide a method of operating an optical phase array. The method may include providing the optical phase array. The method may also include activating or turning on the laser source.

Various embodiments may provide a method of forming an optical phase array. The method may include providing a laser source configured to emit a laser. The method may include coupling an integrated photonic network with n stages of optical splitters to the laser source.

BRIEF DESCRIPTION OF THE DRAWINGS

The invention will be better understood with reference to the detailed description when considered in conjunction with the non-limiting examples and the accompanying drawings, in which:

FIG. 4B shows the voltages which can be applied to the different stages of the network according to various embodiments.

DETAILED DESCRIPTION

Figure 1A:
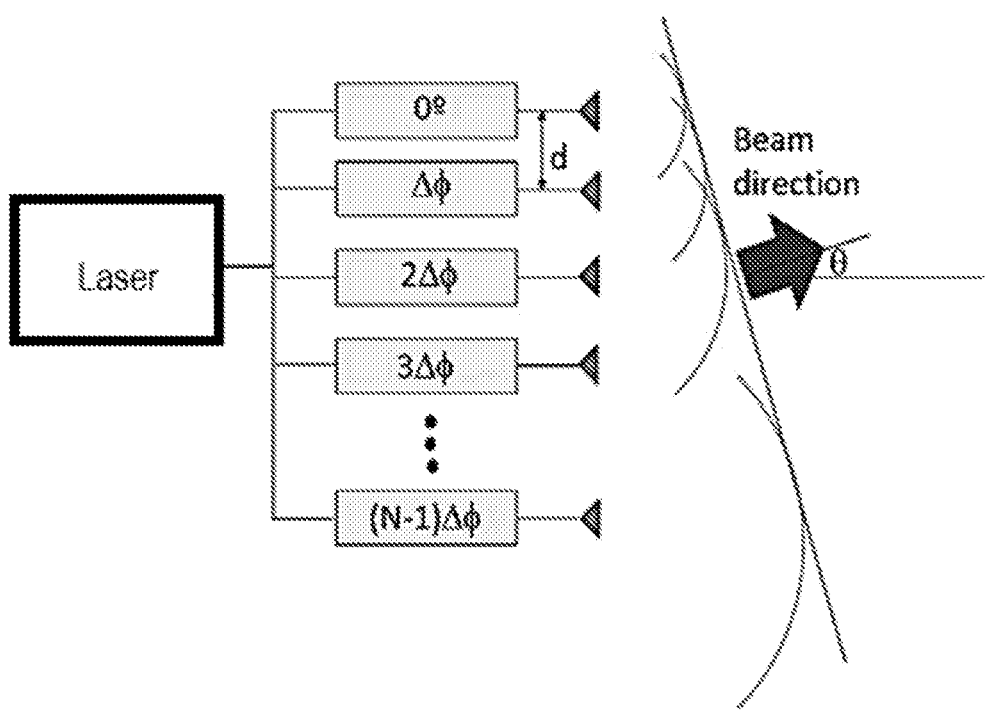
FIG. 1A shows the operation principle of an optical phased array (OPA) which has N number of channels.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or optical phase array are analogously valid for the other methods or optical phase arrays. Similarly, embodiments described in the context of a method are analogously valid for an optical phase array, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The optical phase array as described herein may be operable in various orientations, and thus it should be understood that the terms "top", "bottom", etc., when used in the following description are used for convenience and to aid understanding of relative positions or directions, and not intended to limit the orientation of the optical phase array.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

The term "comprise" may be used in the non-limiting sense. A method or structure "comprising" a feature may mean that the method or structure includes the feature, but may also include one or more other features. In various embodiments, the method or structure "including" a feature may mean that the method or structure consisting of the feature, while in various other embodiments, the method or structure "including" a feature may mean that the method or structure includes one or more other features in addition to the feature.

A tree of cascaded 1×2 splitters (based on Y junction or multimode interference (MMI)) may be simple to design, and may be robust without limitation on the number of channels. Various embodiments may possess advantages over conventional architectures and/or address or mitigate issues faced by conventional architectures.

Figure 2:
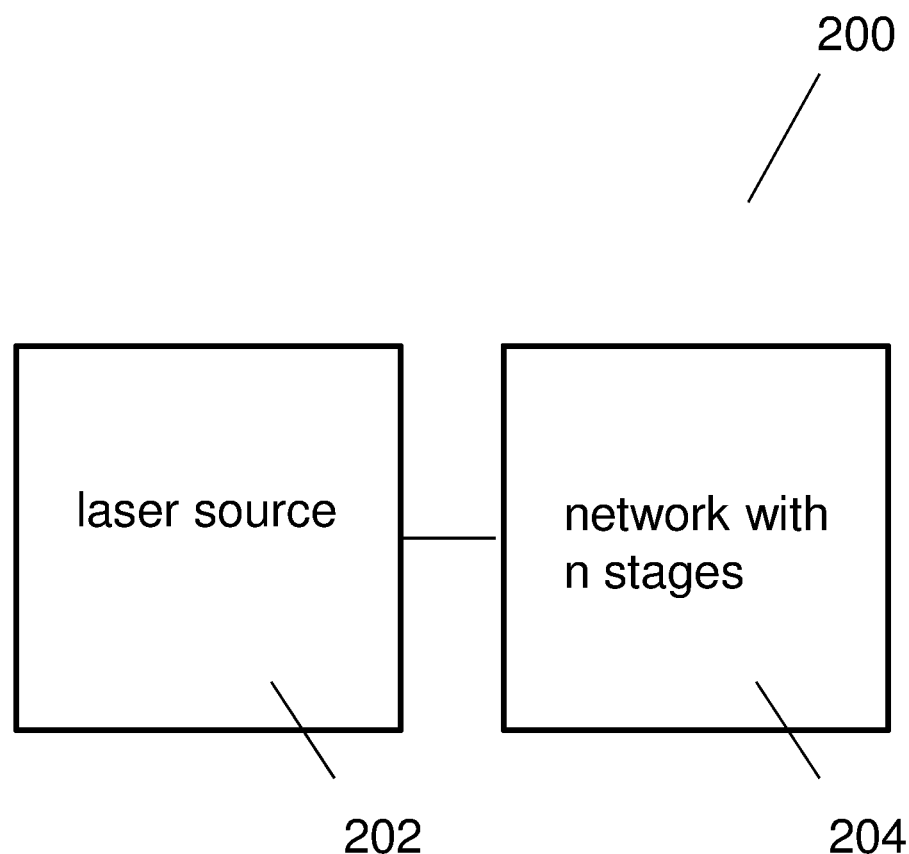
FIG. 2 is a schematic showing an optical phase array according to various embodiments.

FIG. 2 is a schematic showing an optical phase array 200 according to various embodiments. The optical phase array 200 may include a laser source 202 configured to emit a laser. The optical phase array 200 may further include an integrated photonic network 204 with n stages of optical splitters, the optical splitters being 1×2 optical splitters, each optical splitter of the integrated photonic network having an input, a first output, and a second output. The integrated photonic network 204 may be configured to separate the laser into N outputs. N may be an integer representing the number of outputs of the array 200. Each output of the N outputs may differ from a neighbouring output of the N outputs by a constant phase difference ($\Delta\phi$). N and n may be related by $$N=2^n \qquad (3)$$

An output used in the current context may refer to an output laser beam generated by the optical phase array, and N outputs may refer to N output beams generated by optical phase array.

An $i^{th}$ stage of the n stages may have $2^{i-1}$ of the optical splitters, the first output of each optical splitter of the $2^{i-1}$ optical splitters being optically coupled to a first waveguide, and the second output of each optical splitter of the $2^{i-1}$ optical splitters being optically coupled to a second waveguide. The first waveguide of the $i^{th}$ stage may be configured so that a first beam travelling though the first waveguide undergoes no phase shift. The second waveguide of the $i^{th}$ stage may be configured so that a second beam travelling through the waveguide undergoes a phase shift equal to N divided by $2^i$ and further multiplied by the constant phase difference. n may be any integer greater than 1, i.e.

$$= \frac{N}{2^i} \times \Delta\phi.$$

i may be a positive integer between 1 and n inclusive, i.e.

$$1 \leq i \leq n \quad (4)$$

The 1×2 optical splitters may be referred to as Y-splitters.

Various embodiments may relate to a network or array including a cascaded phase shifting architecture with a plurality of 1×2 optical splitters arranged in a tree configuration.

Figure 3:
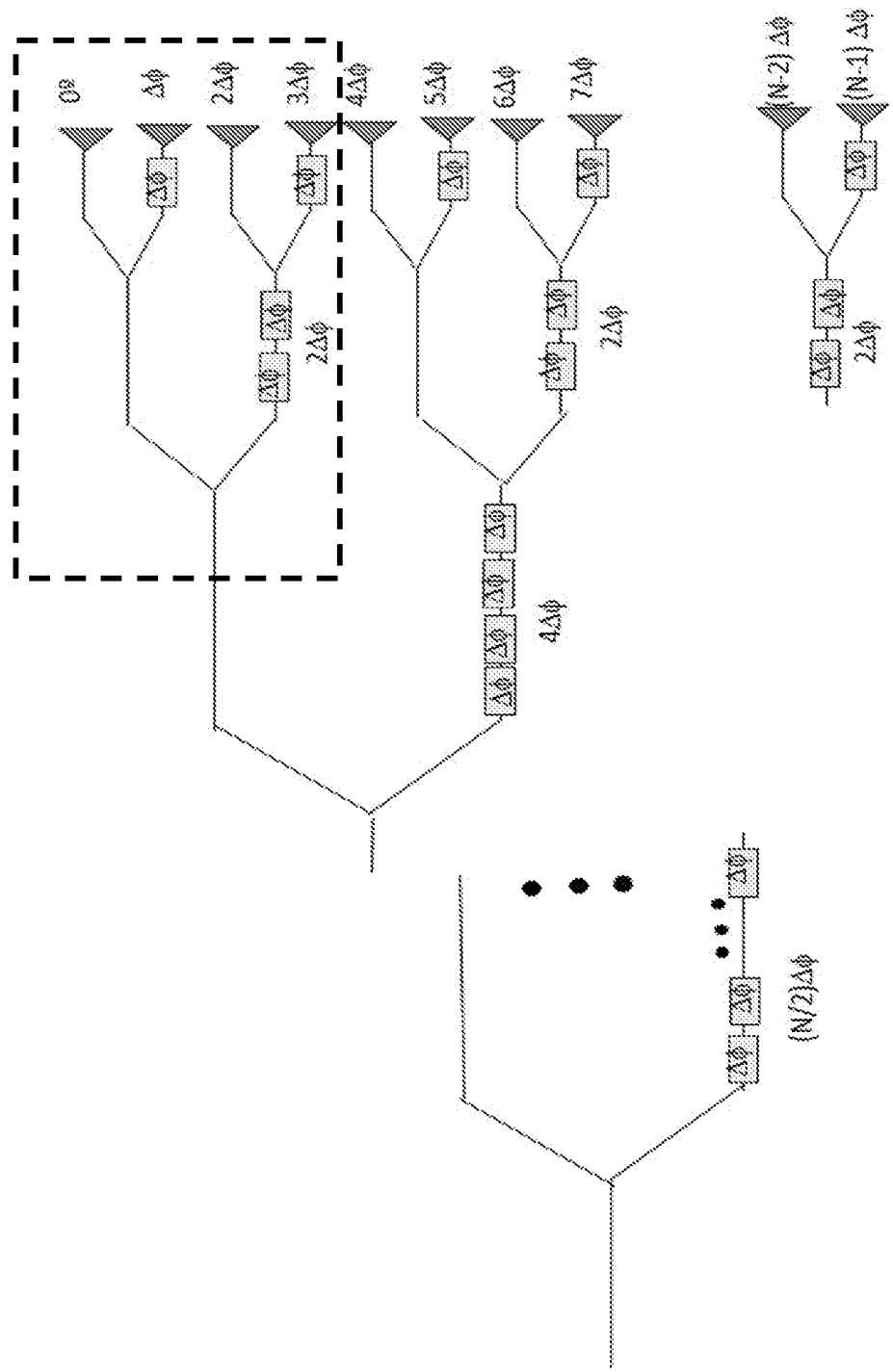
FIG. 3 shows a schematic of a network according to various embodiments.

FIG. 3 shows a schematic of a network 304 according to various embodiments. The network 304 may correspond to the network 204 shown in FIG. 2. As shown in FIG. 3, the network 304 may be configured to provide N outputs (0°, $\Delta\phi$, $2\Delta\phi$ ... (N−1)$\Delta\phi$). In various embodiments, the second waveguide of the $i^{th}$ stage may include or may be coupled to N/$2^i$ phase shifters, each of the N/$2^i$ phase shifters configured to provide a phase shift equal to the constant phase difference ($\Delta\phi$) to the second beam so that the second beam travelling through the waveguide undergoes the phase shift equal to N divided by $2^i$ and further multiplied by the constant phase difference, i.e.

$$= \frac{N}{2^i} \times \Delta\phi.$$

For instance, for a network 304 with 3 stages (n=3) configured to configured to generate 8 outputs (N=$2^3$=8), the second waveguide of the $2^{nd}$ stage may include or may be physically and optically coupled to 8/$2^2$=2 phase shifters, each phase shifter providing a phase shift of $\Delta\phi$, while the second waveguide of the $3^{rd}$ stage may include or may be physically and optically coupled to 8/$2^3$=1 phase shifter, the phase shifter providing a phase shift of $\Delta\phi$. Accordingly, the second stage of the network 304 in this example provides a phase shift of $2\Delta\phi$, while the third stage provides a phase shift of $\Delta\phi$.

The N/$2^i$ phase shifters comprised in or coupled to the second waveguide of the $i^{th}$ stage may be identical to one another. Each of the N/$2^i$ phase shifters may be configured to provide the phase shift equal to the constant phase difference ($\Delta\phi$) by providing a constant voltage (or voltage signal) to each of the N/$2^i$ phase shifters. The identical phase shifters comprised in network 304 may be applied with the same voltage (or voltage signal), and the total phase shift may be provided by:

$$\text{Total phase shift} = \log_2 N \times \frac{N}{2} \times \Delta\phi \quad (5)$$

Figure 1B:
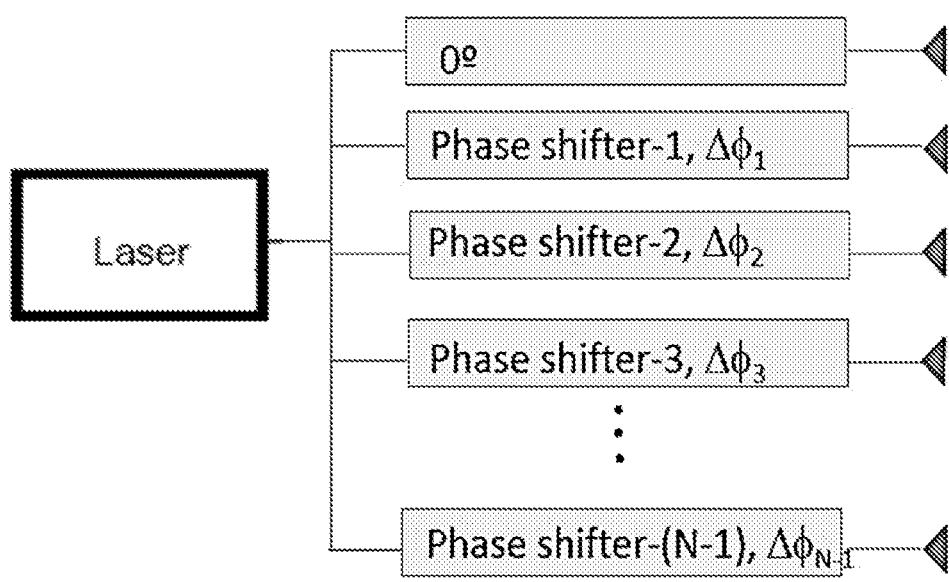
FIG. 1B is a schematic showing a phase shifting architecture with separate phase shifters in different channels to control the phase of optical light traveling along the channels independently.
Figure 1C:
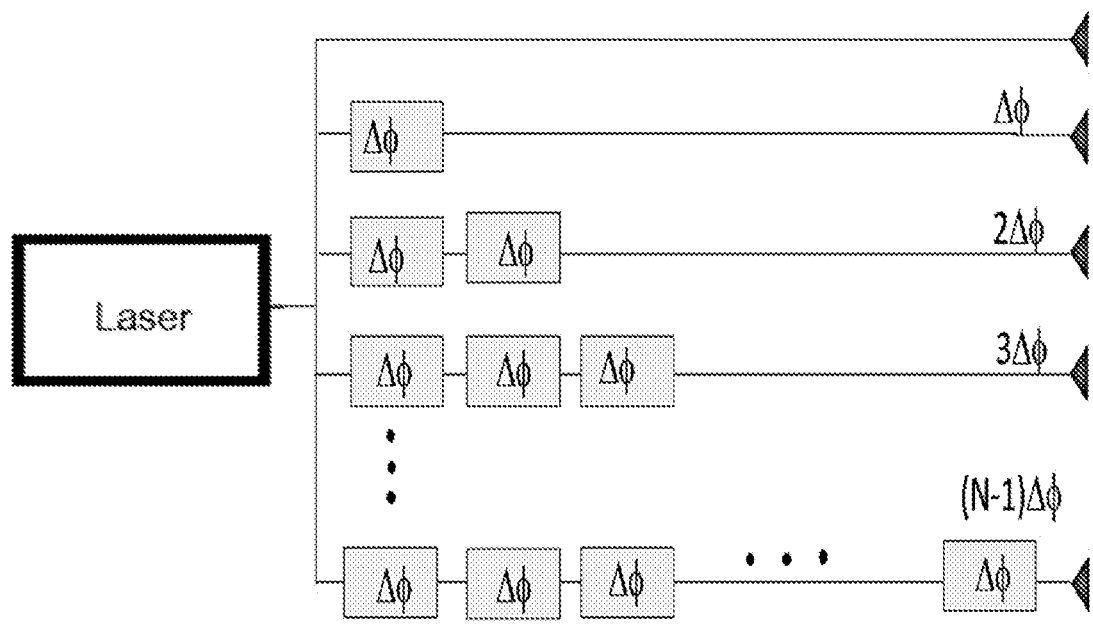
FIG. 1C is a schematic showing another phase shifting architecture in which one voltage (or voltage signal) is applied to identical phase shifters.
Figure 1D:
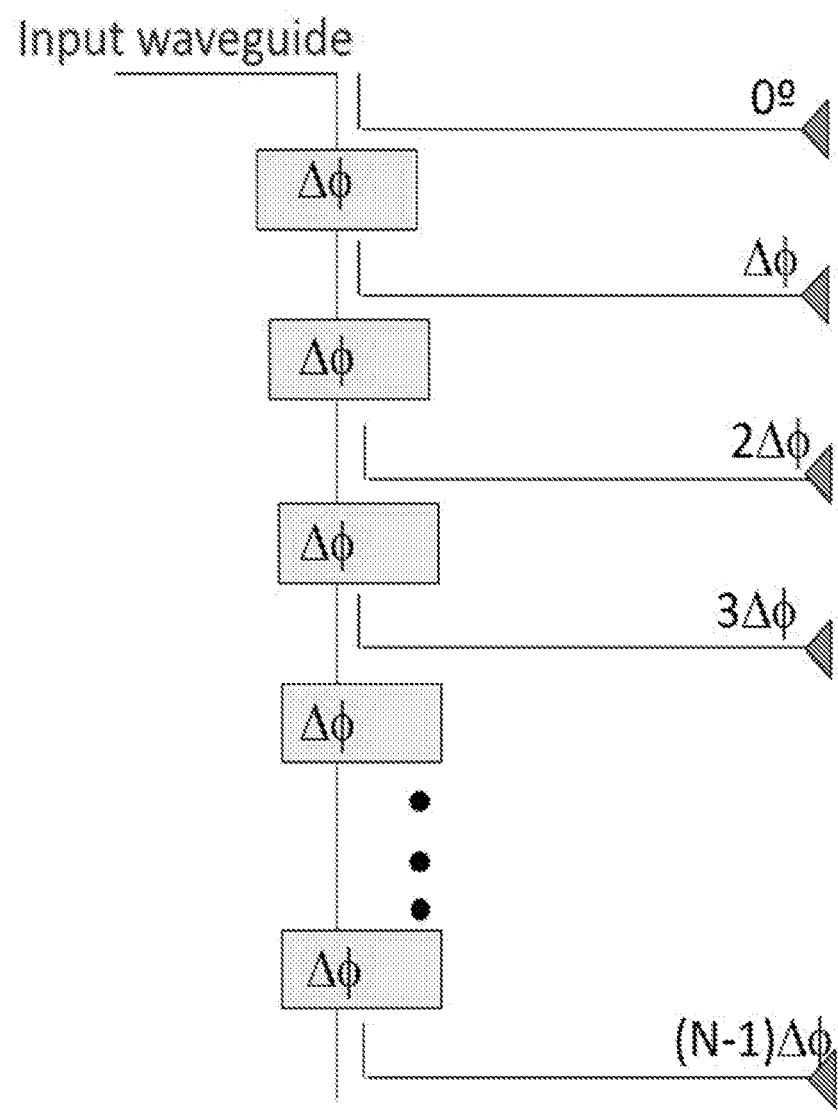
FIG. 1D is a schematic showing yet another phase shifting architecture in which one voltage (or voltage signal) is applied to identical phase shifters.

An array including the network 304 may have a total phase shifter less than the array shown in FIG. 1C.

The N/$2^i$ phase shifters comprised in or coupled to the second waveguide of the $i^{th}$ stage may be thermo-optic phase shifters or electro-optic phase shifters.

In a part of the network 304 such as one indicated by the dashed box in FIG. 3, the network 304 may include a first Y-splitter configured to receive a laser beam from the laser source, and further configured to split the laser beam into a first beam along a first path, the first path configured to generate no phase shift on the first beam, and a second beam along a second path, the second path configured to generate a phase shift, e.g. $2\Delta\phi$, on the second beam. The network 304 may also include a second Y-splitter coupled to the first path and configured to receive the first beam, and further configured to split the first beam into a third beam along a third path, the third path configured to generate no phase shift on the third beam, and fourth beam along a fourth path, the fourth path configured to generate a phase shift on the fourth beam substantially half the phase shift generated on the second beam, e.g. $\Delta\phi$. The network 304 may additionally include a third Y-splitter coupled to the second path and configured to receive the second beam, and further configured to split the second beam into a fifth beam along a fifth path, the fifth path configured to generate no phase shift on the fifth beam, and a sixth beam along a sixth path, the sixth path configured to generate a phase shift on the sixth beam substantially half the phase shift generated on the second beam, e.g. $\Delta\phi$.

The phase shift on the fourth beam may be applied by a phase shifter configured to receive a predetermined voltage. The phase shift on the sixth beam may be applied by a further phase shifter configured to receive a predetermined voltage substantially equal to the predetermined voltage received by the phase shifter so that the phase shift on the sixth beam is substantially equal to the phase shift on the fourth beam, e.g. $\Delta\phi$. The phase shift on the second beam may be applied by two additional phase shifters, each of the two additional phase shifters configured to receive a predetermined voltage substantially equal to the predetermined voltage received by the phase shifter so that the phase shift on the second beam (e.g. $2\Delta\phi$) is substantially twice the phase shift on the fourth beam (e.g. $\Delta\phi$).

In addition, as shown by FIG. 3, the network 304 may further include one or more other phase shifters and Y-splitters. The network 304 may include a plurality of phase shifters and Y-splitters arranged in a tree configuration.

Figure 4A:
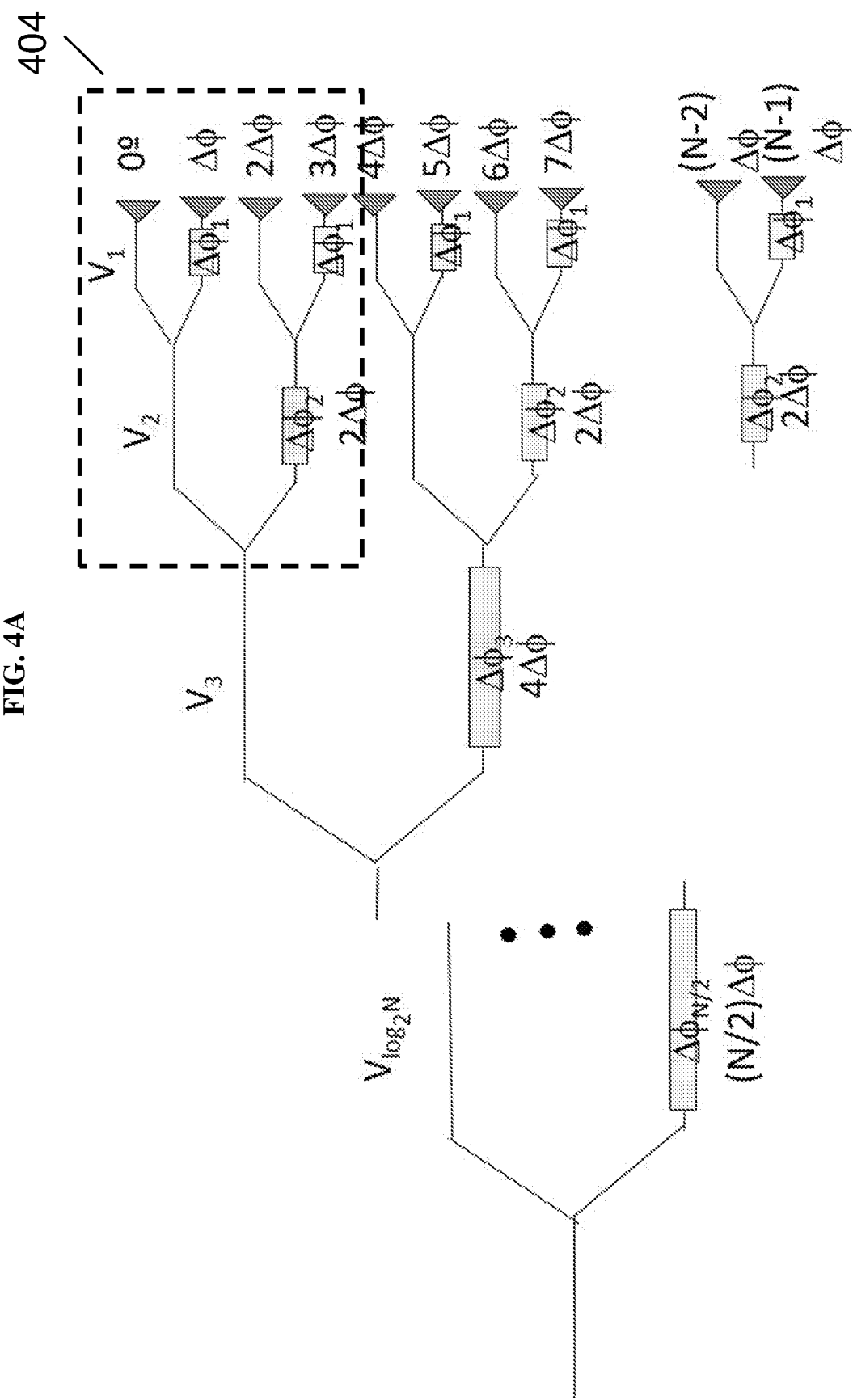
FIG. 4A shows a schematic of a network according to various other embodiments.

FIG. 4A shows a schematic of a network 404 according to various other embodiments. The network 404 may correspond to the network 204 shown in FIG. 2. The second waveguide of the $i^{th}$ stage may include or may be coupled to a phase shifter configured to provide a phase shift of N divided by $2^i$ and further multiplied by the constant phase difference, i.e.

$$\left( = \frac{N}{2^i} \times \Delta\phi \right)$$

to the second beam so that the second beam travelling through the waveguide undergoes the phase shift equal to N divided by $2^i$ and further multiplied by the constant phase difference, i.e.

$$\left( = \frac{N}{2^i} \times \Delta\phi \right).$$

In other words, the second waveguide of an optical splitter in the $i^{th}$ stage may include or may be coupled to a single phase shifter which is configured to generate the entire phase shift of the beam required in the $i^{th}$ stage.

The phase shifter comprised in the second waveguide may be a thermo-optic phase shifter or an electro-optic phase shifter.

The phase shifter comprised in or coupled to the second waveguide of the $i^{th}$ stage may be configured to provide the phase shift of N divided by $2^i$ and further multiplied by the constant phase difference, i.e.

$$= \frac{N}{2^i} \times \Delta\phi,$$

at a predetermined voltage or voltage signal.

The network 404 may include a plurality of phase shifters comprised in or coupled to the plurality of second waveguides, with each second waveguide of each optical splitter having or coupled to one phase shifter of the plurality of phase shifters. The plurality of phase shifters may be identical or similar to one another, but with different voltages or voltage signals applied so that the beams traveling along the second waveguides at the different stages of the network 404 experience different phase shifts.

For instance, for a network 404 with 3 stages (n=3) configured to configured to generate 8 outputs (N=$2^3$=8), the second waveguide of the $2^{nd}$ stage may include or may be physically and optically coupled to one phase shifter configured to provide a phase shift of $8/2^2 \times \Delta\phi = 2\phi$, while the second waveguide of the $3^{rd}$ stage may include or may be physically and optically coupled to another one phase shifter configured to provide a phase shift of $8/2^3 \times \Delta\phi = \phi$, and while the second waveguide of the $1^{st}$ stage may include or may be physically and optically coupled to yet another one phase shifter configured to provide a phase shift of $8/2^1 \times \Delta\phi = 4\phi$. The one phase shifter, the another one phase shifter, and the yet another one phase shifter may be identical or similar to one another, but may be applied with different voltages or voltage signals to provide the different phase shifts required.

In a part of the network 404 such as one indicated by the dashed box in FIG. 4A, the network 404 may include a first Y-splitter configured to receive a laser beam from the laser, and further configured to split the laser beam into a first beam along a first path, the first path configured to generate no phase shift on the first beam, and a second beam along a second path, the second path configured to generate a phase shift, e.g. 2φ, on the second beam. The network 404 may also include a second Y-splitter coupled to the first path and configured to receive the first beam, and further configured to split the first beam into a third beam along a third path, the third path configured to generate no phase shift on the third beam, and fourth beam along a fourth path, the fourth path configured to generate a phase shift on the fourth beam substantially half the phase shift generated on the second beam, e.g. φ. The network 406 may additionally include a third Y-splitter coupled to the second path and configured to receive the second beam, and further configured to split the second beam into a fifth beam along a fifth path, the fifth path configured to generate no phase shift on the fifth beam, and a sixth beam along a sixth path, the sixth path configured to generate a phase shift on the sixth beam substantially half the phase shift generated on the second beam, e.g. φ. The phase shift on the fourth beam, e.g. φ, may be applied by one phase shifter. The phase shift on the sixth beam may be applied by a further one phase shifter so that the phase shift on the sixth beam is substantially equal to the phase shift on the fourth beam, e.g. φ. The phase shift on the second beam may be applied by an additional one phase shifter so that the phase shift on the second beam is substantially twice the phase shift on the fourth beam, e.g. 2φ.

In addition, as shown by FIG. 4A, the network 404 may further include one or more other phase shifters and Y-split-ters. The network 404 may include a plurality of phase shifters and Y-splitters arranged in a tree configuration.

The network 404 shown in FIG. 4A may require $\log_2 N$ voltages or voltage signals, which may be less than that required for the configuration shown in FIG. 1B.

In the case of identical thermo-optic (TO) phase shifters used for each stage, $$\Delta\phi \propto P = \frac{V^2}{R} \qquad (6)$$

where V is voltage applied to the TO heater and R is the resistance of the heater. Once the TO heater reaches $2\pi$ phase shift, the voltage may be re-set.

FIG. 4B shows the voltages which can be applied to the different stages of the network 204 according to various embodiments. The voltage or voltage signal applied to each of the phase shifters within each stage may be substantially equal to one another. The voltage or voltage signals applied to phase shifters at different stages may be as illustrated in FIG. 4B.

Generally speaking, the phase shifters comprised in the networks 204, 304, or 404 may be thermo-optic phase shifters or electro-optic phase shifters. The phase shifters may provide the required refractive index changes to generate phase differences of the N outputs. The optical phase array 200 or network 204, 304, 404 may be configured so that each of the N outputs has a power equal to 1/N of a power of the laser emitted by the laser source 202. The substantially equal N outputs may be generated simultaneously.

In various embodiments, an output of the N outputs may be Δφ in front of a first neighbouring output of the N outputs, but may be Δφ behind a second neighbouring output of the N outputs.

In various embodiments, the number of stages may be greater than 2, greater than 3, greater than 4, greater than 5 . . . , greater than 100, greater than 1000 . . . etc. In other words, n may be any integer greater than 2, greater than 3, greater than 4, greater than 5 . . . , greater than 100, greater than 1000 . . . etc.

Various embodiments may be developed on silicon nitride (SiN) platform for operating at about 1064 nm wavelength, or on silicon (Si) platform for operating at about 1550 nm.

Figure 5:
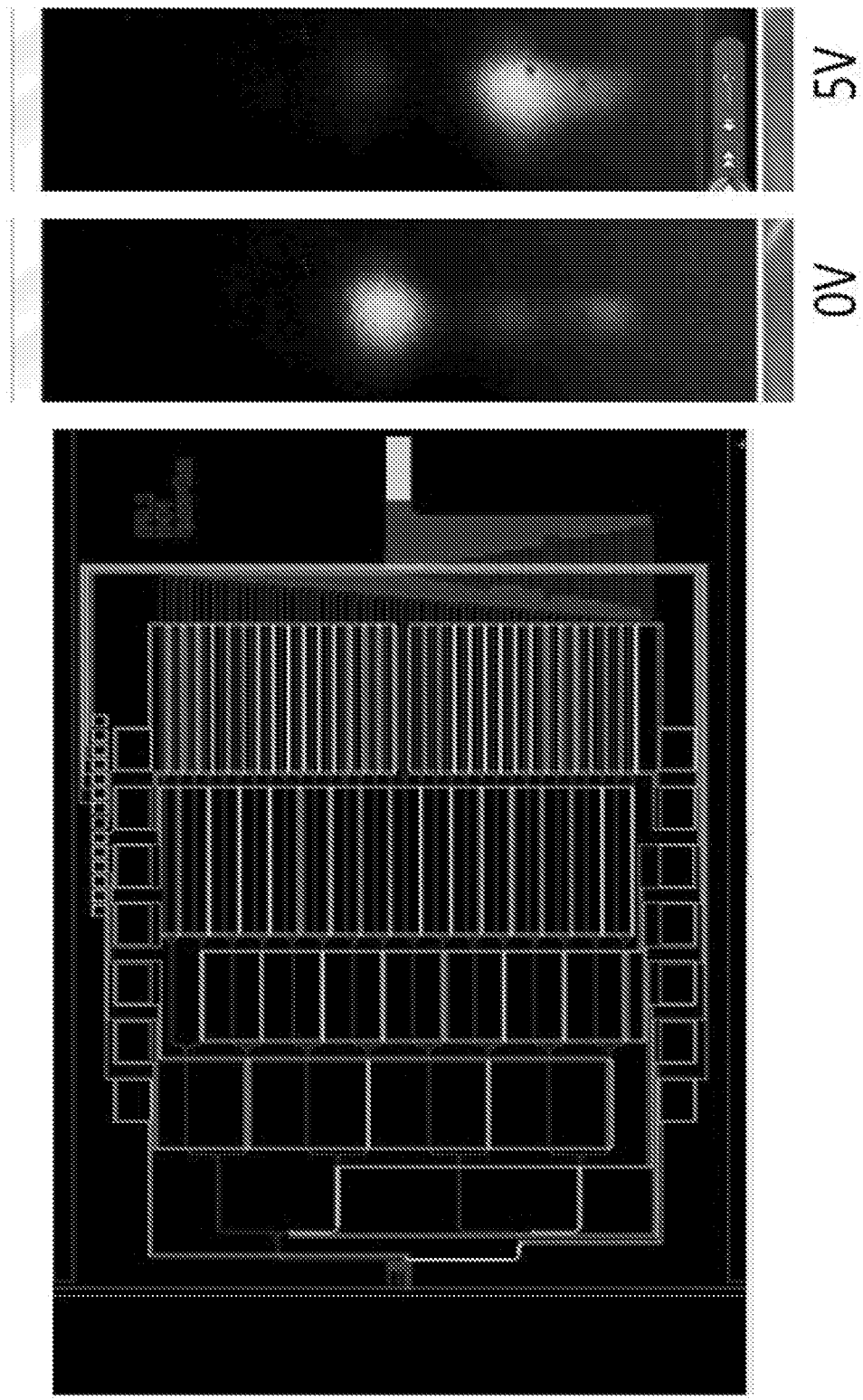
FIG. 5 shows (left) a 64 channel optical phase array according to various embodiments, (middle) an output spot far field when a voltage of about 0 V is applied to the optical phase array shown on the left, and (right) the output spot far field when the voltage is changed to about 5 V.

FIG. 5 shows (left) a 64 channel optical phase array according to various embodiments, (middle) an output spot far field when a voltage of about 0 V is applied to the optical phase array shown on the left, and (right) the output spot far field when the voltage is changed to about 5 V.

Figure 6:
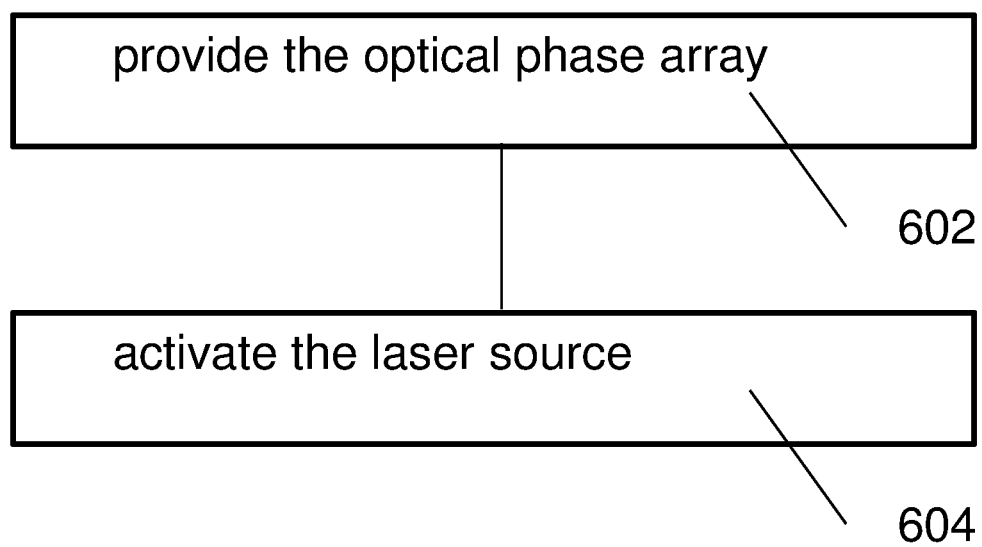
FIG. 6 is a schematic showing a method of operating an optical phase array according to various embodiments.

FIG. 6 is a schematic showing a method of operating an optical phase array according to various embodiments.

The method may include, in 602, providing the optical phase array. The optical phase array may be any array as described herein. The array may include a laser source configured to emit a laser. The optical phase array may further include an integrated photonic network with n stages of optical splitters, the optical splitters being 1×2 optical splitters, each optical splitter of the integrated photonic network having an input, a first output, and a second output. The integrated photonic network may be configured to separate the laser into N outputs. Each output of the N outputs may differ from a neighbouring output of the N outputs by a constant phase difference (Δφ). N and n may be related by Equation (3).

An $i^{th}$ stage of the n stages may have $2^{i-1}$ of the optical splitters, the first output of each optical splitter of the $2^{i-1}$ optical splitters being optically coupled to a first waveguide, and the second output of each optical splitter of the $2^{i-1}$ optical splitters being optically coupled to a second waveguide. The first waveguide of the $i^{th}$ stage may be configured so that a first beam travelling though the first waveguide undergoes no phase shift. The second waveguide of the $i^{th}$ stage may be configured so that a second beam travelling through the waveguide undergoes a phase shift equal to N divided by $2^i$ and further multiplied by the constant phase difference, i.e.

$$= \frac{N}{2^i} \times \Delta\phi.$$

n may be any integer greater than 1.

The method may also include, in 604, activating or turning on the laser source.

In various embodiments, the network may be the network shown in FIG. 3. The second waveguide of the $i^{th}$ stage may include $N/2^i$ phase shifters, each of the $N/2^i$ phase shifters configured to provide a phase shift equal to the constant phase difference to the second beam so that the second beam travelling through the waveguide undergoes the phase shift equal to N divided by $2^i$ and further multiplied by the constant phase difference, i.e.

$$= \frac{N}{2^i} \times \Delta\phi.$$

There may be no phase shifter comprised in the first waveguide of the $i^{th}$ stage. The method may further include applying a constant voltage or voltage signal to each of the $N/2^i$ phase shifters. The $N/2^i$ phase shifters comprised in the second waveguide of the $i^{th}$ stage may be thermo-optic phase shifters or electro-optic phase shifters. The constant voltage or voltage signal applied to each of the $N/2^i$ phase shifters may be adjusted to vary a direction of the N outputs. The voltage or voltage signal applied to each of the phase shifter of the network may be adjusted equally to steer the outputs from a first direction to a second direction different from the first direction.

In various other embodiments, the network may be the network shown in FIG. 4A. The phase shifter comprised in the second waveguide of the $i^{th}$ stage may be configured to provide the phase shift of N divided by $2^i$ and further multiplied by the constant phase difference at a predetermined voltage, i.e.

$$= \frac{N}{2^i} \times \Delta\phi.$$

There may be no phase shifter comprised in the first waveguide of the $i^{th}$ stage. The phase shifter comprised in the second waveguide may be a thermo-optic phase shifter or an electro-optic phase shifter. The predetermined voltage or voltage signals applied to the phase shifter may be adjusted in a fixed ratio, e.g. by varying a voltage value in the equations shown in FIG. 4B to obtain different voltage values to be applied to phase shifters at different stages, to vary a direction of the N outputs.

In various embodiments, adjusting a voltage or a plurality of voltages applied to the phase shifters comprised in the network may vary or steer a direction of the N outputs.

Figure 7:
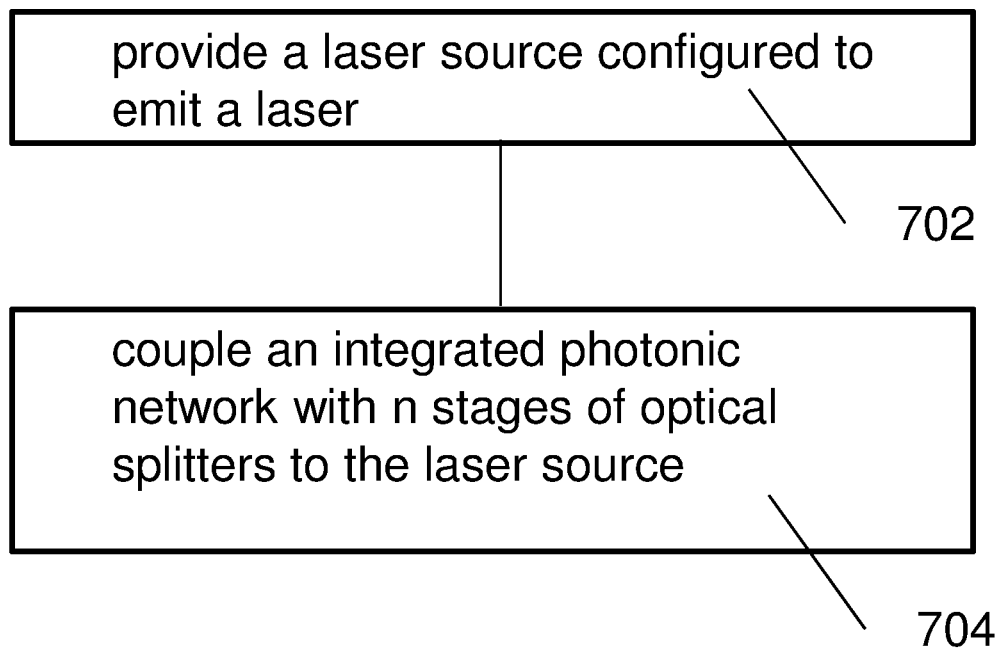
FIG. 7 is a schematic showing a method of forming an optical phase array according to various embodiments.

FIG. 7 is a schematic showing a method of forming an optical phase array according to various embodiments. The method may include, in 702, providing a laser source configured to emit a laser. The method may include, in 704, coupling an integrated photonic network with n stages of optical splitters to the laser source.

The integrated photonic network may be configured to separate the laser into N outputs. The optical splitters may be 1×2 optical splitters, each optical splitter of the integrated photonic network having an input, a first output, and a second output.

Each output of the N outputs may differ from a neighbouring output of the N outputs by a constant phase difference ($\Delta\phi$). N and n may be related by Equation (3).

An $i^{th}$ stage of the n stages has $2^{i-1}$ of the optical splitters, the first output of each optical splitter of the $2^{i-1}$ optical splitters being optically coupled to a first waveguide, and the second output of each optical splitter of the $2^{i-1}$ optical splitters being optically coupled to a second waveguide. The first waveguide of the $i^{th}$ stage may be configured so that a first beam travelling though the first waveguide undergoes no phase shift. The second waveguide of the $i^{th}$ stage may be configured so that a second beam travelling through the waveguide undergoes a phase shift equal to N divided by $2^i$ and further multiplied by the constant phase difference, i.e.

$$= \frac{N}{2^i} \times \Delta\phi.$$

N may be any integer greater than 1.

The method may also include forming the integrated photonic network. The method may include arranging a plurality of optical splitters and a plurality of phase shifters in n stages. The method may further include coupling the optical splitters and the phase shifters with waveguides.

Various embodiments may relate to an optical phase array formed by a method as described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical phase array comprising:
   a laser source configured to emit a laser;
   an integrated photonic network with n stages of optical splitters, the optical splitters being 1×2 optical splitters, each optical splitter of the integrated photonic network having an input, a first output, and a second output;
   wherein the integrated photonic network is configured to separate the laser into N outputs;
   wherein each output of the N outputs differs from a neighbouring output of the N outputs by a constant phase difference;
   wherein N and n are related by $N=2^n$;
   wherein an $i^{th}$ stage of the n stages has $2^{i-1}$ of the optical splitters, the first output of each optical splitter of the $2^{i-1}$ optical splitters being optically coupled to a first waveguide, and the second output of each optical splitter of the $2^{i-1}$ optical splitters being optically coupled to a second waveguide;

wherein the first waveguide of the $i^{th}$ stage is configured so that a first beam travelling through the first waveguide undergoes no phase shift;

wherein the second waveguide of the $i^{th}$ stage is configured so that a second beam travelling through the waveguide undergoes a phase shift equal to N divided by $2^i$ and further multiplied by the constant phase difference; and wherein n is any integer greater than 1.

2. The optical phase array according to claim 1, wherein the second waveguide of the $i^{th}$ stage comprises $N/2^i$ phase shifters, each of the $N/2^i$ phase shifters configured to provide a phase shift equal to the constant phase difference to the second beam so that the second beam travelling through the waveguide undergoes the phase shift equal to N divided by $2^i$ and further multiplied by the constant phase difference.

3. The optical phase array according to claim 2, wherein the $N/2^i$ phase shifters comprised in the second waveguide of the $i^{th}$ stage are identical to one another.

4. The optical phase array according to claim 3, wherein each of the $N/2^i$ phase shifters is configured to provide the phase shift equal to the constant phase difference by providing a constant voltage to each of the $N/2^i$ phase shifters.

5. The optical phase array according to claim 2 wherein the $N/2^i$ phase shifters comprised in the second waveguide of the $i^{th}$ stage are thermo-optic phase shifters or electro-optic phase shifters.

6. The optical phase array according to claim 1, wherein the second waveguide of the $i^{th}$ stage comprises a phase shifter configured to provide a phase shift of N divided by $2^i$ and further multiplied by the constant phase difference to the second beam so that the second beam travelling through the waveguide undergoes the phase shift equal to N divided by $2^i$ and further multiplied by the constant phase difference.

7. The optical phase array according to claim 6, wherein the phase shifter comprised in the second waveguide of the $i^{th}$ stage is configured to provide the phase shift of N divided by $2^i$ and further multiplied by the constant phase difference at a predetermined voltage.

8. The optical phase array according to claim 5, wherein the phase shifter comprised in the second waveguide is a thermo-optic phase shifter or an electro-optic phase shifter.

9. The optical phase array according to claim 1, wherein n is any integer greater than 2.

10. The optical phase array according to claim 1, wherein the optical phase array is configured so that each of the N outputs has a power equal to 1/N of a power of the laser emitted by the laser source.

11. A method of operating an optical phase array, the method comprising:

providing the optical phase array, the phase array comprising:

a laser source configured to emit a laser;

an integrated photonic network with n stages of optical splitters, the optical splitters being 1×2 optical splitters, each optical splitter of the integrated photonic network having an input, a first output, and a second output;

wherein the integrated photonic network is configured to separate the laser into N outputs;

wherein each output of the N outputs differs from a neighbouring output of the N outputs by a constant phase difference;

wherein N and n are related $N=2^n$;

wherein an $i^{th}$ stage of the n stages has $2^{i-1}$ of the optical splitters, the first output of each optical splitter of the $2^{i-1}$ optical splitters being optically coupled to a first waveguide and the second output of each optical splitter of the $2^{i-1}$ optical splitters being optically coupled to a second waveguide;

wherein the first waveguide of the $i^{th}$ stage is configured so that a first beam travelling through the first waveguide undergoes no phase shift;

wherein the second waveguide of the $i^{th}$ stage is configured so that a second beam travelling through the waveguide undergoes a phase shift equal to N divided by $2^i$ and further multiplied by the constant phase difference; and wherein n is any integer greater than 1; and activating the laser source.

12. The method according to claim 11, wherein the second waveguide of the $i^{th}$ stage comprises $N/2^i$ phase shifters, each of the $N/2^i$ phase shifters configured to provide a phase shift equal to the constant phase difference to the second beam so that the second beam travelling through the waveguide undergoes the phase shift equal to N divided by $2^i$ and further multiplied by the constant phase difference; and wherein the method further comprises applying a constant voltage to each of the $N/2^i$ phase shifters.

13. The method according to claim 12, wherein the constant voltage applied to each of the $N/2^i$ phase shifters is adjusted to vary a direction of the N outputs.

14. The method according to claim 12, wherein the $N/2^i$ phase shifters comprised in the second waveguide of the $i^{th}$ stage are thermo-optic phase shifters or electro-optic phase shifters.

15. The method according to claim 11, wherein the second waveguide of the $i^{th}$ stage comprises a phase shifter configured to provide a phase shift of N divided by $2^i$ and further multiplied by the constant phase difference to the second beam so that the second beam travelling through the waveguide undergoes the phase shift equal to N divided by $2^i$ and further multiplied by the constant phase difference.

16. The method according to claim 15, wherein the phase shifter comprised in the second waveguide of the $i^{th}$ stage is configured to provide the phase shift of N divided by $2^i$ and further multiplied by the constant phase difference at a predetermined voltage.

17. The method according to claim 16, wherein the predetermined voltage applied to the phase shifter is adjusted to vary a direction of the N outputs.

18. The optical phase array according to claim 15, wherein the phase shifter comprised in the second waveguide is a thermo-optic phase shifter or an electro-optic phase shifter.

19. A method of forming an optical phase array, the method comprising:

providing a laser source configured to emit a laser;

coupling an integrated photonic network with n stages of optical splitters to the laser source;

wherein the integrated photonic network is configured to separate the laser into N outputs;

wherein the optical splitters are 1×2 optical splitters, each optical splitter of the integrated photonic network having an input, a first output, and a second output;

wherein each output of the N outputs differs from a neighbouring output of the N outputs by a constant phase difference;

wherein N and n are related by $N=2^n$;

wherein an $i^{th}$ stage of the n stages has $2^{i-1}$ of the optical splitters, the first output of each optical splitter of the $2^{i-1}$ optical splitters being optically coupled to a first waveguide, and the second output of each optical splitter of the $2^{i-1}$ optical splitters being optically coupled to a second waveguide;

wherein the first waveguide of the $i^{th}$ stage is configured so that a first beam travelling through the first waveguide undergoes no phase shift;

wherein the second waveguide of the $i^{th}$ stage is configured so that a second beam travelling through the waveguide undergoes a phase shift equal to N divided by $2^i$ and further multiplied by the constant phase difference; and wherein n is any integer greater than 1.

20. The method according to claim 19, the method further comprising:

forming the integrated photonic network.

\* \* \* \* \*